United States Patent
Fontana et al.

(10) Patent No.: US 11,588,934 B1
(45) Date of Patent: *Feb. 21, 2023

(54) PREDICTED LOCATION OFFERS LEVERAGING COMMUNITY BASED COST OF LIVING RECOMMENDATIONS

(71) Applicant: Wells Fargo Bank, N.A., San Francisco, CA (US)

(72) Inventors: Laura M. Fontana, San Francisco, CA (US); Amita Kheterpal, Oakland, CA (US); Daniel Oshima, San Francisco, CA (US); Samuel Ostler, Ross, CA (US); Marria Rhodriquez, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/951,683

(22) Filed: Nov. 18, 2020

Related U.S. Application Data

(63) Continuation of application No. 15/688,213, filed on Aug. 28, 2017, now Pat. No. 10,855,835.

(51) Int. Cl.
*G06Q 30/02* (2012.01)
*H04M 3/42* (2006.01)
*H04W 4/30* (2018.01)
*G06Q 30/0201* (2023.01)

(52) U.S. Cl.
CPC .... *H04M 3/42136* (2013.01); *G06Q 30/0201* (2013.01); *H04W 4/30* (2018.02); *H04M 2242/15* (2013.01)

(58) Field of Classification Search
None
See application file for complete search history.

(56) References Cited

U.S. PATENT DOCUMENTS

| | | | |
|---|---|---|---|
| 7,487,112 B2 | 2/2009 | Barnes, Jr. | |
| 7,660,737 B1 | 2/2010 | Lim et al. | |
| 8,027,877 B2 | 9/2011 | Crolley | |
| 8,280,766 B2 | 10/2012 | Higgins et al. | |
| 8,676,650 B1* | 3/2014 | Jurca | G06Q 30/0275 705/14.57 |
| 2003/0083931 A1 | 5/2003 | Lang | |
| 2006/0200384 A1 | 9/2006 | Arutunian et al. | |
| 2008/0059205 A1* | 3/2008 | Dayan | G06Q 30/00 705/14.1 |
| 2010/0004997 A1 | 1/2010 | Mehta et al. | |
| 2010/0153008 A1* | 6/2010 | Schwartz | G01C 21/20 705/14.27 |
| 2012/0047011 A1 | 2/2012 | Rippetoe et al. | |
| 2012/0054028 A1 | 3/2012 | Tengler et al. | |
| 2012/0064820 A1 | 3/2012 | Bemmel | |
| 2012/0239471 A1 | 9/2012 | Grimm et al. | |
| 2012/0278165 A1 | 11/2012 | Mercuri et al. | |
| 2012/0310713 A1 | 12/2012 | Mercuri et al. | |

(Continued)

*Primary Examiner* — Chrystina E Zelaskiewicz
(74) *Attorney, Agent, or Firm* — Foley & Lardner LLP

(57) ABSTRACT

A computing system predicts a need of a customer based at least in part on a location of the customer, recommend a physical location to the customer based on the predicted need using location-based costs of living, and recommending offers to merchants based on historical activities of a plurality of customers.

20 Claims, 4 Drawing Sheets

(56) References Cited

U.S. PATENT DOCUMENTS

| | | | |
|---|---|---|---|
| 2013/0046631 A1* | 2/2013 | Grigg | G06Q 20/387 |
| | | | 705/14.58 |
| 2013/0046636 A1 | 2/2013 | Asnake | |
| 2013/0297378 A1* | 11/2013 | Hong | G06Q 30/0201 |
| | | | 705/7.29 |
| 2014/0172573 A1* | 6/2014 | Saurabh | G06Q 30/0261 |
| | | | 705/14.58 |
| 2014/0201004 A1 | 7/2014 | Parundekar et al. | |
| 2015/0304819 A1* | 10/2015 | Busch | G06Q 30/0236 |
| | | | 705/14.54 |
| 2015/0348112 A1 | 12/2015 | Ramanujam | |
| 2016/0027055 A1 | 1/2016 | Dixon et al. | |
| 2016/0170998 A1* | 6/2016 | Frank | G06F 16/337 |
| | | | 707/748 |
| 2016/0232572 A1 | 8/2016 | East et al. | |
| 2017/0249667 A1* | 8/2017 | Castrechini | G06Q 30/0238 |

* cited by examiner

PREDICTED LOCATION OFFERS LEVERAGING COMMUNITY BASED COST OF LIVING RECOMMENDATIONS

CROSS-REFERENCE TO RELATED APPLICATIONS

This application is a continuation of U.S. patent application Ser. No. 15/688,213, filed Aug. 28, 2017, the contents of which are hereby incorporated by reference in its entirety.

TECHNICAL FIELD

Embodiments of the present disclosure relate generally to systems and methods for recommending offers to customer and merchants.

BACKGROUND

For onsite shopping, customers usually collect and use sales coupons offered by local stores (e.g., grocery stores, shopping malls, restaurants, etc.) that come in the mails, through newspapers, and/or from the internet in order to save money with deals. Customers can also do research online and/or via phone calls to find the best deals nearby. On the other hand, merchants, in an effort to encourage onsite shopping, attempt to make advertisements reach customers who are likely to purchase the advertised products/services, thereby generating increased revenues. Merchants can utilize targeted advertising technologies whereby advertisements are placed based on various traits of customers such as demographics, psychographics, behavioral variables (e.g., product purchase history), etc. Customers are generally interested in getting better deals and merchants are generally interested in reaching more potential customers in an effective way.

SUMMARY

One example embodiment relates to a method. The method comprises receiving transaction data comprising transaction information associated with an account of a customer of a financial institution; receiving location data comprising a physical location of the customer; analyzing the transaction data, by a computing system, to determine a recurring financial transaction associated with at least one of a good and a service; determining, by a computing system, a need of a customer for the at least one of the good and the service based at least in part on the location data and the recurring financial transaction; determining a plurality of locations where the at least one of the good and the service can be obtained and a cost of the at least one of the good and the service at each respective location; for each of the plurality of locations, calculating a cost of travel from the physical location of the customer to each respective location; determining a recommended location based on the respective cost of the at least one of the good and the service and the respective cost of travel to each respective location; and transmitting, by the computing system to a user device of the customer, the recommended location including information on the at least one of the good and the service.

Another example embodiment relates to a method. The method comprises receiving transaction data associated with a plurality of customers; analyzing, by a computing system, the transaction data to identify patterns of activities for various demographic groups; determining recommendations to a merchant based on the pattern of activities for various demographic groups; and transmitting, by the computing system to a merchant computing system, the recommendations including a price point for at least one of a good and a service.

Another example embodiment relates to a computing system. The computing system comprises a network interface configured to communicate data to and from external devices, memory, and a processor. The processor is structured to receive transaction data comprising transaction information associated with an account of a customer of a financial institution; receive location data comprising a physical location of the customer; analyze the transaction data to determine a recurring financial transaction associated with at least one of a good and a service; determine a need of a customer for the at least one of the good and the service based at least in part on the location data and the recurring financial transaction; determine a plurality of locations where the at least one of the good and the service can be obtained and a cost of the at least one of the good and the service at each respective location; for each of the plurality of locations, calculate a cost of travel from the physical location of the customer to each respective location; determine a recommended location based on the respective cost of the at least one of the good and the service and the respective cost of travel to each respective location; and transmit to a user device of the customer the recommended location including information on the at least one of the good and the service.

Another example embodiment relates to a computing system. The computing system comprises a network interface configured to communicate data to and from external devices, memory, and a processor. The processor is structured to receive transaction data associated with a plurality of customers; analyze the transaction data to identify patterns of activities for various demographic groups; determine recommendations to a merchant based on the pattern of activities for various demographic groups; and transmit to a merchant computing system the recommendations including a price point for at least one of a good and a service.

A further example embodiment relates to a non-transitory computer-readable media having computer-executable instructions embodied therein, when executed by a processor of a computing system, cause the computing system to perform a process. The process includes receiving transaction data comprising transaction information associated with an account of a customer of a financial institution; receiving location data comprising a physical location of the customer; analyzing the transaction data to determine a recurring financial transaction associated with at least one of a good and a service; determining a need of a customer for the at least one of the good and the service based at least in part on the location data and the recurring financial transaction; determining a plurality of locations where the at least one of the good and the service can be obtained and a cost of the at least one of the good and the service at each respective location; for each of the plurality of locations, calculating a cost of travel from the physical location of the customer to each respective location; determining a recommended location based on the respective cost of the at least one of the good and the service and the respective cost of travel to each respective location; and transmitting to a user device of the customer the recommended location including information on the at least one of the good and the service.

Yet another example embodiment relates to a non-transitory computer-readable media having computer-executable instructions embodied therein, when executed by a processor of a computing system, cause the computing system to perform a process. The process includes receiving transaction data associated with a plurality of customers; analyzing the transaction data to identify patterns of activities for various demographic groups; determining recommendations to a merchant based on the pattern of activities for various demographic groups; and transmitting to a merchant computing system the recommendations including a price point for at least one of a good and a service.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE FIGURES

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Figure 1:
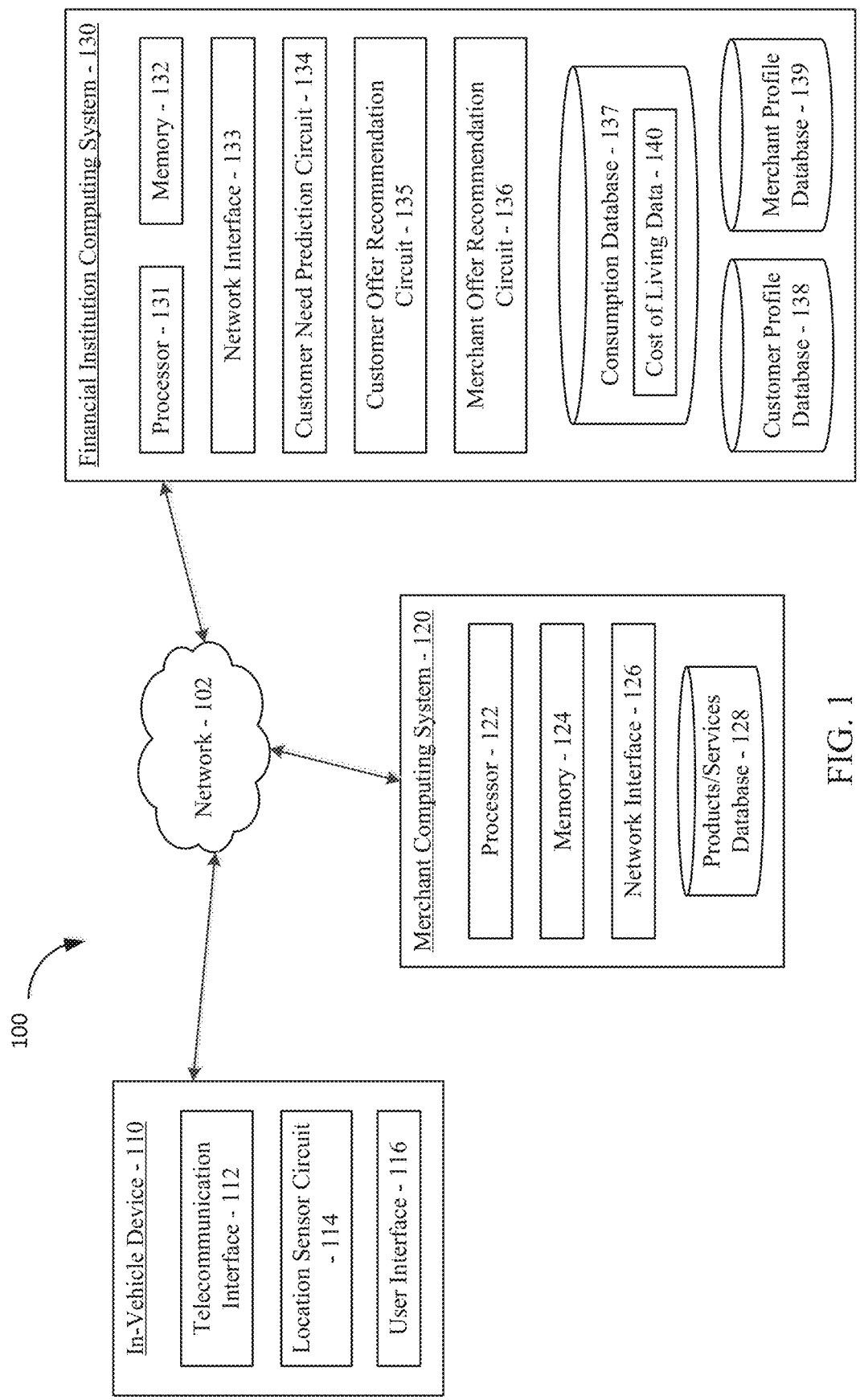
FIG. 1 is a block diagram of a computing environment for recommending offers to customers and merchants according to an example embodiment.

Referring generally to the figures, systems and methods for recommending offers for onsite shopping to customers and merchants are shown. Such systems and methods may use the current/predicted location of a customer to predict the customer's need and leverage community based costs of living to recommend a physical location of a merchant, as well as offers provided by the merchant, to the customer. Recommendation to the customer may take into account cost of travel to the physical location. The systems and methods may also aggregate and analyze information about onsite shopping activities of a plurality of customer and recommend to merchants (i.e., brick and mortar store locations) certain price points/promotions the merchants can offer to certain customers. Recommendations to merchants may take into account various traits (e.g., demographics, behavioral variables) of customers. As an example, a customer is driving a vehicle to a shopping mall on a weekend. A mobile device (e.g., a smartphone) or an onboard device (e.g., a telematics device) in the vehicle reports the current location or the destination of the customer to a remote server operated by, for example, a financial institution. The server predicts that the customer is going shopping based on the reported location and time of the day or the customer's past activities. The server searches its database to find other shopping malls located in communities with lower costs of living. The server then determines whether it is worth it for the customer to drive to another shopping mall based on travel cost (e.g., fuel cost, time spent, etc.) and potential savings. The server recommends to the customer a shopping mall worth driving to as well as possible offers provided by the shopping mall. On the other hand, the server aggregates and analyzes onsite shopping activities of a plurality of customers and makes recommendations to shopping malls regarding what prices/promotions to offer to certain customers. For example, the server may tell a shopping mall that people in certain demographic group are likely to drive certain distance if certain promotions are offered.

Embodiments described herein solve the technical and internet-centric problems of using smart car technology and/or other mobile technology of helping customers find, on a real-time basis, an onsite shopping location (i.e., a brick and mortar store location) to save money. This is addressed by predicting a customer's need based on current/predicted location of the customer reported by a mobile device or an onboard device in a vehicle and recommending to the customer an onsite shopping location. On the other hand, embodiments described herein solve the technical and internet-centric problems of facilitating merchants to place advertisements to reach more potential customers in an effective way. This is addressed by aggregating and analyzing shopping activities of a plurality of customers and recommending price points/promotions that merchants can provide to potential customers.

Referring to FIG. 1, a diagram of a computing environment 100 for recommending offers to customers and merchants is depicted according to an example embodiment. The computing environment 100 includes one or more in-vehicle devices 110 used by individuals (e.g., customers) in vehicles and one or more merchant computing systems 120 used by merchants, both in-vehicle devices 110 and merchant computing system 120 connected to a network 102. Also connected to the network 102 is a financial institution computing system 130. In the environment 100, data communication between the in-vehicle devices 110, the merchant computing systems 120, and the financial institution computing system 130 may be facilitated by the network 102. In some arrangements, the network 102 includes the internet. In other arrangements or combinations, the network 102 includes a local area network or a wide area network. The network 102 may be facilitated by short and/or long range communication technologies including Bluetooth transceivers, Bluetooth beacons, RFID transceivers, NFC transceivers, Wi-Fi transceivers, cellular transceivers, wired network connections, etc.

The in-vehicle device 110 is located in a vehicle and can transmit the current location or predicted location of the vehicle to the financial institution computing system 130 and receive recommendations from the financial institution computing system 130 via the network 102. In some arrangements, the in-vehicle device 110 is a mobile device which may be, for example, a smartphone, a portable media device, a personal digital assistant (PDA), a laptop computer, a personal computer, a computerized eyewear, a computerized watches, or the like. The mobile device may have various applications installed thereon, such as a map application, digital wallet application, and so on. A customer may walk into the vehicle with the mobile device. The mobile device can have an application installed thereon which, when activated, make the mobile device transmit the current/predicted location of the vehicle to the financial institution computing system 130 and receive recommended offers from the financial institution computing system 130. The application may be activated manually by the customer or activated automatically in response to detecting that the mobile device is brought into the vehicle. In some arrangements, the mobile device detects that it is brought into a vehicle when being connected to the in-vehicle Bluetooth system, Wi-Fi system, or the like.

In other arrangements, the in-vehicle device 110 is an onboard device, for example, a telematics system built in or physically connected in the vehicle. In general, a telematics system is the convergence of telecommunications and information processing, which involves receiving, processing, and sending information via telecommunication devices. Telematics systems have been widely used in various vehicular applications. The onboard telematics system may transmit information relating to the vehicle, including current location and/or predicted location, to the financial institution computing system 130 and receive recommendations from the financial institution computing system 130 via the network 102.

The in-vehicle device 110 is shown to include a telecommunication interface 112, a location sensor circuit 114, and a user interface 116. The in-vehicle device 110 may further include components not shown in the present Figure, such as a processor and memory. The telecommunication interface 112 allows the in-vehicle device 110 to send and receive data to and from external devices and entities via the network 102. Although not shown in FIG. 1, the telecommunication interface 112 may include an antenna, a radio frequency (RF) transceiver, and a subscriber identity module (SIM). The telecommunication interface 112 may follow any type of mobile communication protocols, for example but not limited to, cellular, satellite, radio, Wi-Fi, WiMax, Bluetooth®, ZigBee®, CDMA, GSM, GPRS, LTE, or the like.

The location sensor circuit 114 is configured to track the current location of the in-vehicle device 110 and/or determine the destination of the trip intended by the customer. The location sensor circuit 114 may include a global positioning system (GPS) receiver to track latitude, longitude, elevation, etc. of the vehicle. The location sensor circuit 114 may include a map application installed on the mobile device (i.e., when the in-vehicle device 110 is a mobile device) or an onboard GPS navigation map (i.e., when the in-vehicle device 110 is an onboard device). When the customer inputs an address into the map application or the onboard map, the location sensor circuit 114 is configured to determine that it is the destination of the mission.

The user interface 116 allows the customer to interact with the in-vehicle device 110 for inputting instructions and receiving information. In some arrangements in which the in-vehicle device 110 is a mobile device, the user interface 116 may include a display and an input. The display and the input may be combined (e.g., as a touchscreen display device) or discrete devices. The display can present messages to the customer in various forms (e.g., text, graph, voice, animation). The input may include any of speakers, keyboards, notification LEDs, microphones, biometric sensors (e.g., fingerprint scanners), buttons, switches, cameras, or a combination thereof. The customer may input a destination address by using a keyboard and/or speaker, via the user interface 116. The recommendations from the financial institution computing system 130 and other information is displayed through the user interface 116. In some arrangements in which the in-vehicle 110 is an onboard device, the user interface 116 may include, for example, an interactive display (e.g., a touchscreen, etc.), a dashboard, a control panel, etc.

The merchant computing systems 120 are associated with merchants, such as but not limited to, grocery stores, shopping malls, retailers, personal maintenance service providers, restaurants, movie theaters, etc. A merchant has a physical location that can be visited by customers to make purchases. The merchant computing systems 120 may provide backend support for merchant transactions, inventory management, advertisements, including but not limited to, merchant credit card system, merchant gift cards, merchant website, and the like. The merchant computing system 120 is shown to include a processor 122, memory 124, network interface 126, and products/services database 128. Memory 124 stores various program instructions that, when executed by the processor 122, control the operations of the merchant computing system 120. The network interface 126 allows the merchant computing system 120 to send and receive data to and from the financial institution computing system 130 via the network 102. The products/services database 128 stores information relating to products/services offered by the merchant, including products/services names/codes, price points for the products/services, payment arrangements applicable to the products/services, promotion programs regarding the products/services, inventory, and so on.

The financial institution computing system 130 is associated with a financial institution (e.g., a bank, a credit card issuer, etc.). The financial institution computing system 130 is shown to include a processor 131, memory 132, and network interface 133. Memory 132 stores various program instructions that, when executed by the processor 131, control the operations of the financial institution computing system 130. The network interface 133 allows the financial institution computing system 130 to send and receive data to and from the in-vehicle devices 110 and the merchant computing systems 120 via the network 102. In some arrangements, the financial institution computing system 130 is implemented as a cloud network including multiple computing systems, which can share and transfer information and data store, and coordinate to process the received data.

The financial institution computing system 130 is shown to include a customer need prediction circuit 134, a customer offer recommendation circuit 135, and a merchant offer recommendation circuit 136. The customer need prediction circuit 134 is configured to predict a customer need based at least in part on a current location and/or a predicted location of the customer. The customer offer recommendation circuit 135 is configured to recommend a physical location of merchant as well as offers provided by the merchant to the customer based on the predicted customer need. The merchant offer recommendation circuit 136 is configured to recommend price points and/or promotions the merchants can offer to certain customers. Details of the functions performed by each of the circuits will be discussed in detail below.

Still referring to FIG. 1., the financial institution computing system 110 further includes various database, for example, consumption database 137, customer profiles database 138, and merchant profiles database 140.

The consumption database 137 may hold, store, categorize, and otherwise serve as a repository of consumption information. The consumption information may include expenditure facts and consumption statistics. The financial institution computing system 130 may collect and aggregate expenditure facts as of how much money people spend on food, clothing, shelter, transportation, etc. in a period of time. The expenditure facts may be collected from transactions the financial institution computing system 130 has facilitated (e.g., credit card clearing and settlement, check settlement) and/or other private or governmental sources (e.g., the Bureau of Labor Statistics). The consumption statistics can be obtained by breaking down expenditure facts by various categories, such as geographic areas, demographic groups, types of consumption, etc. The consumption statistics includes cost of living data 140 which indicate the costs of living at various communities/neighborhoods for various demographic groups during a period of time. The cost of living data 140 may break down by food, clothing, shelter, entertainment, and so on. The financial institution computing system 130 may conduct the statistics by itself and/or obtain the statistics from other private or governmental sources (e.g., the Bureau of Labor Statistics).

The customer profiles database 118 may hold, store, categorize, and otherwise serve as a repository of customer information. The customer information may include personal profile, accounts information, past activities, etc. In some arrangements, the financial institution computing system 130 may collect the information during providing services to customers (e.g., banking services, mortgage services, credit card clearing and settlement, check clearing and settlement, etc.). For example, a customer can have one or more financial accounts (e.g., check account, savings account, mortgage account, credit card account, etc.) with the financial institution. When opening the financial account(s), the customer may submit personal profile information (e.g., age, gender, status, address, employer, income, etc.) to the financial institution, which is saved at the financial institution computing system 130. Moreover, a customer can use online services (e.g., online banking, mobile wallet) provided by the financial institution, which can collect information on shopping activities (items, locations, amounts, etc.) and save the information at the financial institution computing system 130. In some arrangements, the financial institution computing system 130 may alternatively or additionally collect the customer information from associated entities, e.g., merchants, other financial institutions, and so on.

The merchant profiles database 140 may hold, store, categorize, and otherwise serve as a repository of merchant information. The merchant information may include merchant profile, accounts information, subscription information, etc. In some arrangements, merchants subscribe to data services (e.g., consumption data, offer recommendation) provided by the financial institution computing system 130. In some arrangements, merchants may have one or more financial accounts with and use banking services provided by the financial institution (e.g., settlement). Merchants can submit information (physical location, products/services offered, price points/promotion) to the financial institution, which is saved at the financial institution computing system 130. In some arrangements, the financial institution computing system 130 alternatively or additionally obtains the information from the merchant computing system 120 or associated entities, e.g., other financial institutions.

In some arrangements, the financial institution provides data services, such as offer recommendation services and/or consumption data at a cost to merchants who have subscribed to the services. In some arrangements, the financial institution provides data services for free to merchants who are using banking services of the financial institution. In order to use the data services, the financial institution provides a software development kit (SDK) to merchants in some arrangements. The merchants can use the SDK to create applications running on the merchant computing system 120 to interact and interface with the financial institution computing system 130 to obtain data. In some arrangements, the SDK includes an application programming interface (API) framework. The API framework allows gathered consumption data (e.g., customer demographics, spending habits, etc.) to be utilized by the merchant computing systems 120. In some arrangements, the financial institution computing system 130 does not provide the original financial information of a particular customer to merchants.

As discussed above, the customer need prediction circuit 134 is configured to predict customer need based at least in part on a current location and/or predicted location of the customer. In some arrangements, the location sensor circuit 114 is configured to track the current location of the vehicle by using a GPS and the telecommunication interface 112 transmits the tracked location to the financial institution computing system 130 via the network 102. In some arrangements, the location sensor circuit 114 is configured to predict a destination of the mission by using an address input by the customer through a map application or onboard GPS navigation map. The telecommunication interface 112 transmits the predicted destination to the financial institution computing system 130 via the network 102.

The customer need prediction circuit 134 may be configured to use various approaches to predict the customer's need based on the current/predicted location. As an example, when the current location or destination is received, the customer need prediction circuit 134 is configured to search the merchant profile database 139 to identify all merchants nearby (e.g., within half mile of the location) and if there are multiple merchant stores, determine the most probable store the customer is visiting considering time of the day. For example, the customer need prediction circuit 134 is configured to identify a restaurant, a grocery store, and a barber shop, and a movie theater all located in a plaza the customer is at or heading to. If the current time is, for example, 6:00 pm, the customer need prediction circuit 134 is configured to predict that the customer is going to have lunch at the restaurant. If the current time is 10:00 pm, when all stores except for the movie theater are closed, the customer need prediction circuit 134 is configured to predict that the customer is going to watch a movie at the movie theater, and so on.

As another example, the customer need prediction circuit 134 is configured to predict the customer's need through data mining and machine learning using historical activities of the customer. For example, the customer usually drives from home to a restaurant for dinner on Friday evenings, does grocery shopping Sunday mornings on the way back from church, gets a haircut on the last Saturday of a month, goes to a bar the day the night of the pay day. The customer need prediction circuit 134 is configured to identify and store the patterns. When the customer gets into the vehicle at home on a Friday evening, the customer need prediction circuit 134 is configured to predict that the customer is going out to have a dinner. When the customer gets into the vehicle at a church parking lot Sunday morning, the customer need prediction circuit 134 is configured to predict that the customer is going grocery shopping. When the customer gets into the vehicle at the last Saturday of a month, the customer need prediction circuit 134 is configured to predict that the customer is going to have a haircut. When the customer gets into the vehicle night of the pay day, the customer need prediction circuit 134 is configured to predict that the customer is going to a bar, and so on.

It should be understood that the approaches discussed herein are for illustration not for limitation. The customer need prediction circuit 134 may be configured to use various techniques to predict the customer's need based on the current/predicted location of the customer.

The customer offer recommendation circuit 135 is configured to recommend one or more physical locations of merchants as well as offers provided by the merchants to the customer based on the customer's need predicted by the customer need prediction circuit 134. The recommendations take location based costs of living into consideration. It might be cost effective to travel a certain distance to a certain community/neighborhood for goods and/or services if costs of living is lower there. Oftentimes the customer need is not specific homogeneous goods/services (e.g., gasoline, iPad), but flexible and subject to many factors such as price points and promotions. For example, when the customer is going grocery shopping, the customer buys a basket of food for a week. The customer may choose organic food if the price of organic food is within budget but may not if the price is beyond the budget. As another example, the customer goes to a shopping mall to spend a weekend day. The customer might want to buy some clothes if there is good deal, watch a movie if there is something interesting, and have lunch at a restaurants in the mall. When location based costs of living are leveraged, better cost performance ratio can be achieved, thus the customer may have a better onsite shopping experience.

In particular, the customer offer recommendation circuit 135 is configured to search the consumption database 137 and compares cost of living data 140 for various communities/neighborhood. As discussed above, the cost of living data 140 may break down by types of consumption, geographic areas, and demographic groups. If the customer needs to have a haircut who is a professional and usually goes to a fine salon, the customer offer recommendation circuit 135 is configured to compare cost of living relating to high-end personal maintenance services for professionals in various locations. If the customer is going grocery shopping for a family of four people with two young kids, the customer offer recommendation circuit 135 is configured to compare cost of living data 140 relating to food for families of parents and two kids in various communities/neighborhoods. If the customer is going shopping at a mall who is a college student living on student loans, the customer offer recommendation circuit 135 is configured to compare cost of living data 140 relating to clothes and entertainment for college students with loans in various communities/neighborhood. In some arrangements, the cost of living data 140 is updated periodically, for example, once every week. In some arrangements, the customer offer recommendation circuit 135 is configured to set a distance threshold for the search. For example, the customer offer recommendation circuit 135 is configured to search costs of living for communities/neighborhood within, for example, 20 miles, 30 miles, 50 miles, etc. of the current/predicted location.

Figure 2:
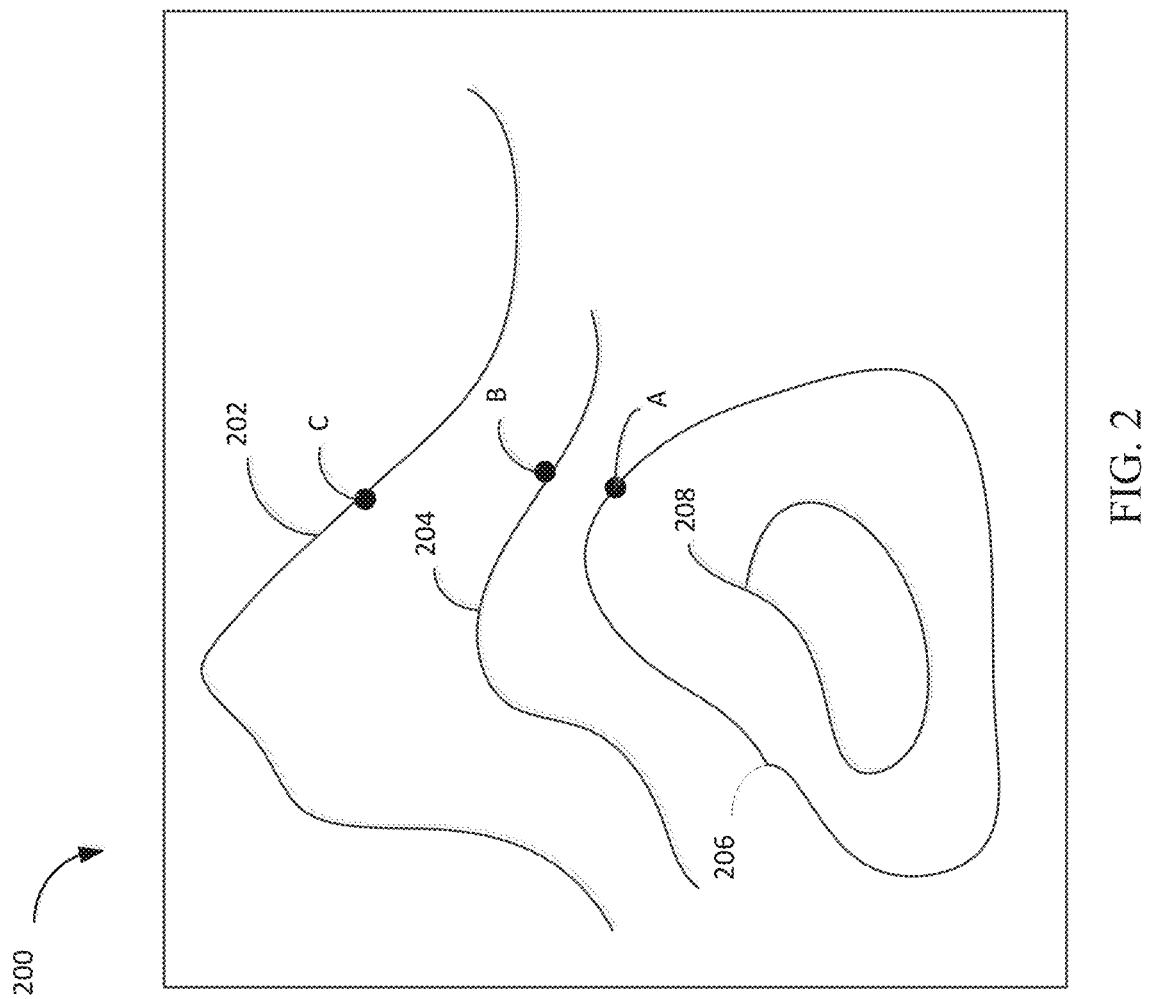
FIG. 2 is a graph of price map displayed at an user interface of an in-vehicle device according to an example embodiment.

In some arrangements, the customer offer recommendation 136 is configured to generate a price map for displaying at the user interface 116 of the in-vehicle device 110. Referring to FIG. 2, a price map 200 displayed at the user interface 116 is shown according to an example embodiment. Like contour lines on a map, curves 202, 204, 206, and 208 represent the price contour lines on a map centered at the current/predicted location. Locations on curve 202 have a first level of cost of living, locations on curve 204 have a second level of cost of living higher than the first level, locations on curve 206 have a third level of cost of living higher than the second level, locations on curve 208 have a fourth level of cost of living higher than the third level. It should be understood that the price map with contour lines is an illustration not a limitation for presenting the community based costs of living information. Any suitable approaches can be utilized to present the information about community based costs of living.

In some arrangements, the customer offer recommendation circuit 135 is configured to determine whether it is worth traveling to a different location/community than the current/predicted location. The customer offer recommendation circuit 135 compares the potential saving at a particular location with the cost of travel to the location. If the potential saving is larger than the cost of travel, it is determined worthwhile traveling to the particular location. If the potential saving is smaller than or equal to the cost of travel, it is determined not worth driving to the location. The potential saving may be the difference of costs of living between the current/predicted location and the particular location. The cost of travel may include both fuel and time. For example, referring to FIG. 2, the customer planned on grocery shopping at a grocery store represented by point A (on price contour line 206) on the map 200. The potential saving at another grocery store at point B (on price contour line 204) is, for example, $10. The potential saving is determined by calculating the difference of cost of living relating to food for the demographic group the customer belongs to along price contour lines 204 and 206. It takes about 15 minutes to drive 8 miles from point A to point B. The customer offer recommendation circuit 135 is configured to determine that it is worth traveling to point B and recommends the grocery store at point B to the customer. In some arrangements, when the in-vehicle device 10 receives the recommendation of the grocery store at point B from the financial institution computing system 130, the location sensor circuit 114 is configured to plan a route and/or navigate the customer to point B. As another example, the potential saving at a grocery store at point C (on price contour lines 202) is $20. It takes about 40 minutes to drive 30 miles from point A to point C. The customer offer recommendation circuit 135 is configured to determine that it is not worth traveling to point C and does not recommend the grocery store at point C to the customer.

In some arrangements, the customer offer recommendation circuit 135 is configured to incorporate local tax rates and/or duty free options (e.g., duty free stores at an airport) into consideration when determining whether to recommend a particular location to the customer. For example, in determining the potential saving in the examples discussed above, the customer offer recommendation circuit 135 is configured to use the local tax rates and/or duty free options to adjust the difference of cost of living between point A and point B or C. As another example, the customer need prediction circuit 134 is configured to predict that the customer is looking to buy/rent a piece of real estate property by detecting that the customer is driving to, for example, an open house event. The customer offer recommendation circuit 135, in determining whether and what physical locations to recommend to the customer, is configured to take into account the property values, interest rate, commute cost to office, cost of livings (e.g., suburbs vs. cities), ancillary cost, and so on.

In some arrangements, in determining whether and what to recommend to the customer, the customer offer recommendation circuit 135 is configured to use historical activities of the customer through data mining and machine learning. As an example, the customer need prediction circuit 134 is configured to predict that the customer is going to a restaurant for dinner. Historical activities of the customer show that the customer has been to steak houses the most, Italian food restaurants the second most, Asian food restaurants the third most, and so on. The customer offer recommendation circuit 135 circuit is configured to recommend restaurants based on the customer's preference for food. For example, recommended restaurants may be in the order of steak houses, Italian food restaurants, Asian food restaurants, and so on. As another example, the customer need prediction circuit 134 is configured to predict that the customer is going to have a haircut. According to past activities, the customer has never been to any recommended barber shops maybe because the customer strongly prefers a barber in the current barber shop he/she is using. The customer offer recommendation circuit 135 is configured to determine not to recommend other barber shops to the customer. It should be understood that the examples described here are for illustration not for limitation. The customer offer recommendation circuit 135 can be configured to use the information of the customer's past activities in various ways to make recommendations to the customer.

In some arrangements, the customer offer recommendation circuit 135 is configured to take demographics into consideration when determining whether and what to recommend to the customer using demographics statistics of a plurality of customers in the same demographic group as the customer. As an example, data stored in the consumption database 137 indicate that retired people have been willing to travel extra 30 minutes to save $20 on groceries, while young professionals have been unlikely to do so. Data stored in the customer profile database 138 shows that the customer is a young professional. Thus, the customer offer recommendation 135 is configured not to recommend to the customer a grocery store with a potential saving of $20 but requiring 30 extra minutes of driving. As another example, the customer offer recommendation circuit 135 is configured to take into consideration services used by customers in the same demographic group when determining whether and what to recommend to the customer. For example, data stored in the consumption database 137 indicate that young males are likely to watch a movie at a movie theatre inside a shopping mall while young females are likely to have a spa at the shopping mall. If the customer profile database 138 shows that the current customer is a young male, the customer offer recommendation circuit 135 is configured to consider saving on watching a movie in determining shopping malls to recommend. If the customer profile database 138 shows that the current customer is a young female, the customer offer recommendation circuit 135 is configured to consider saving on spa services in determining shopping malls to recommend. It should be understood that the examples described here are for illustration not for limitation. The customer offer recommendation circuit 135 can be configured to use the information of the demographics statistics in various ways to make recommendations to the customer.

In some arrangements, the customer offer recommendation circuit 135 is configured to present the recommended location(s) of merchant(s) along with offers/promotions provided by the merchant(s). For example, if the customer needs a haircut, the customer offer recommendation circuit 135 is configured to generate a recommendation to drive to barber stores at a particular neighborhood to get the haircut based on cost of living differences. The recommendation may be more specific, including current prices, applicable coupons, real-time offers from business offering the needed haircut services. The customer offer recommendation circuit 135 is configured to search the merchant profile database 139 to find information relating to merchant offers/promotions and send the information to in-vehicle device 110 via the network 102. In some arrangements, the customer offer recommendation circuit 135 is also configured to analyze various factors and parameters of the individuals that are the potential receivers of any offers. For example, a merchant may have different offers for its members and non-members. The customer offer recommendation circuit 135 is configured to search the customer profile database 138 to determine whether the customer is a member of the merchant and sends respective offers accordingly.

In some arrangements, a merchant may offer a deal that is upcoming in the near future and the customer offer recommendation circuit 135 is configured to present the upcoming offer and make recommendation to the customer accordingly. As an example, a barber shop offers a $5 off coupon that can be used in the following week, the customer need prediction circuit 134 is configured to present the coupon to the customer on his/her way to a barber shop (e.g., every four weeks) and recommends to have the haircut next week.

Still referring to FIG. 1, the merchant offer recommendation circuit 136 is configured to recommend price points and/or promotions the merchants can offer to reach out to potential customers effectively. As discussed above, in some arrangements, the financial institution computing system 130 provides this data service at a cost to merchants who have subscribed to the service. In some arrangements, the financial institution computing system 130 provide this service for free to merchants who are using banking services of the financial institution.

In some arrangements, the merchant offer recommendation circuit 136 is configured to analyze shopping activities of a plurality of customers stored in the consumption database 137 and identify patterns of activities for various demographic groups. For example, consumption data may show that 80% of retired people are willing to drive extra 30 minutes to a grocery store to save $20 while only 20% young professionals are willing to do so. When obtaining the information, the merchant may push an offer (e.g., send advertisements/coupons in mail) to retired people within, for example, 30 miles. In some arrangements, the financial institution computing system 130 does not provide the information of a particular customer (e.g. a retired person) to the merchants. Rather, the merchant may ask the financial institution to reach out to appropriate people on its behalf. The financial institution computing system 130 may save the electronic advertisements/coupons in the merchant profile database 139 and present them to retired people when they are on the way to grocery shopping.

In some arrangements, recommendations made by the merchant offer recommendation circuit 136 to merchants include suggested price points (e.g., suggested retail price) for specific goods/services. For example, consumption data show that sales of specific goods/services can increase 10% when the price point drops 5% for certain demographics group at certain geographic areas. The merchant offer recommendation circuit 136 may recommend to merchants in the area to reduce the price point by 5% if still profitable. It should be understood that the example is described herein for illustration not for limitation. The merchant offer recommendation circuit 137 can be configured to use any appropriate targeted advertising technologies to make recommendations to merchants.

In some arrangements, the consumption data is updated on a real-time basis and the merchant offer recommendation circuit 136 is configured to make recommendations to merchants based on changing demographics. As an example, consumption data show that hotel reservation has increase for certain area due to, for example, an upcoming event (e.g., conference). Merchant offer recommendation circuit 136 is configured to predict a change in demographics, e.g., more professionals are brought into to the area, and adjust recommendations to merchants. For example, the merchant offer recommendation circuit 136 is configured to recommend to raise the price by local hotels, to increase happy hour events by local restaurants and bars, not to offer discounts by local dry cleaners, and so on. It should be understood that the examples described herein are for illustration not for limitation. The merchant offer recommendation circuit 136 can be configured to use information on changing demographics to make recommendations to merchants in any suitable ways.

Figure 3:
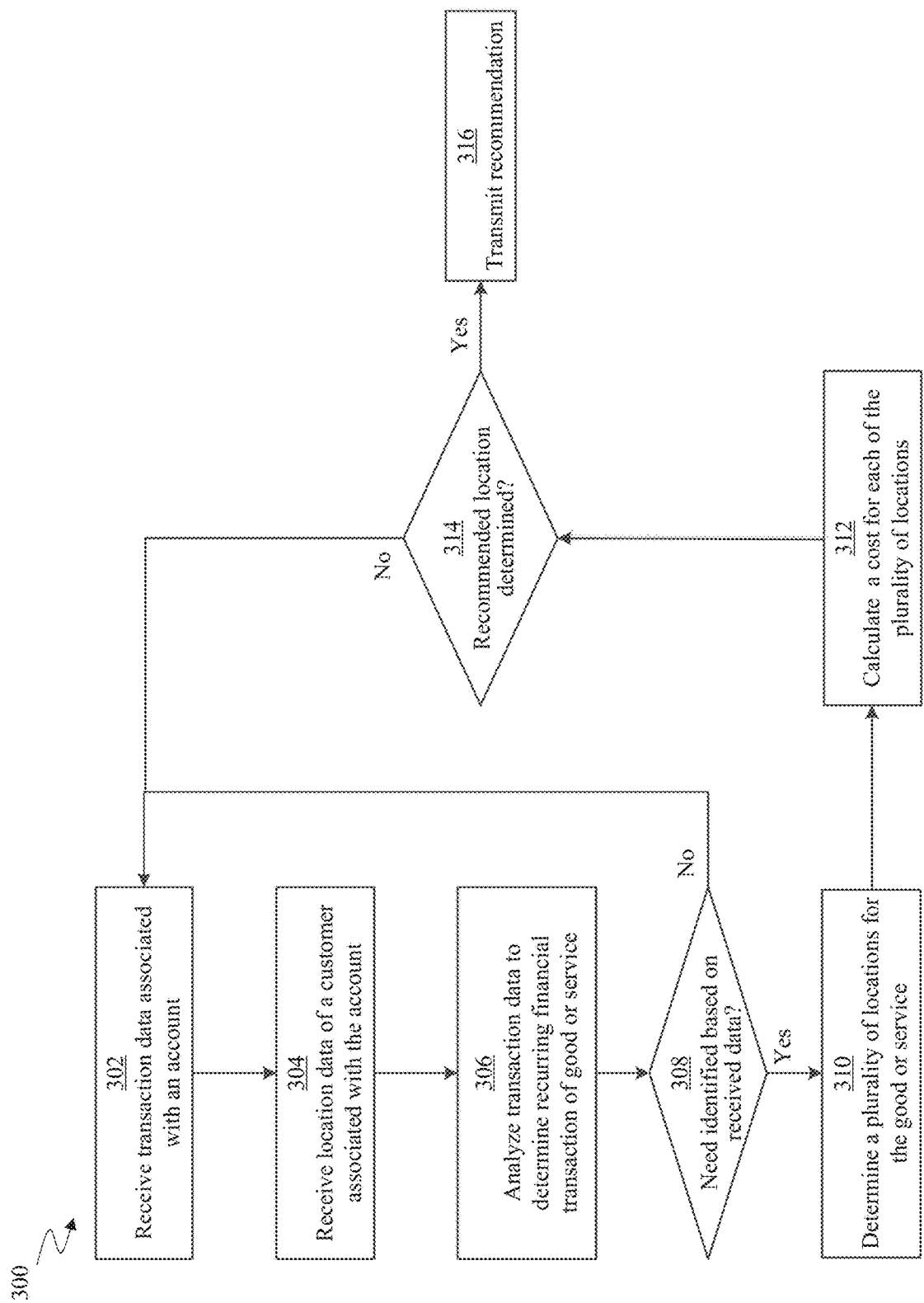
FIG. 3 is a flow diagram of a method of recommending offers to customers according to an example embodiment.

Referring to FIG. 3, a flow diagram of a method 300 of making offer recommendations to customers is shown according to an example embodiment. In some arrangements, the method 300 is performed by a server, for example, the financial institution computing system 130 (e.g., by the processor 131).

At 302, the financial institution computing system 130 receives transaction data associated with an account of a customer. The customer may have one or more financial accounts (e.g., check account, saving account, mortgage account, credit card account, etc.) with the financial institution. During the process of providing services to the customer (e.g., banking services, credit card clearing and settlement, check clearing and settlement, etc.), the financial institution computing system 130 may receive data indicative of various aspects of transactions associated with the account of the customer, such as the good/service involved in the transaction, price point, time of transaction, payment arrangement, and so on.

At 304, the financial institution computing system 130 receives location data of the customer associated with the account. The location data is indicative of a current physical location or a predicted physical location of the customer. In some arrangements, the current location of the customer is tracked by a GPS on an in-vehicle device 110 (e.g., a mobile device brought into the vehicle or an onboard device). In some arrangements, the predicted location is a destination address input by the customer through a map application or onboard GPS navigation map. The in-vehicle device 110 may transmits the current/predicted location of the consumer to the financial institution computing system 130 via network 102.

At 306, the financial institution computing system 130 analyzes the transaction data to determine a recurring financial transaction associated with at least one of a good and a service. For example, the financial institution computing system 130 identifies a pattern of financial transactions by the customer, for example, the customer usually goes to a restaurant for dinner on Friday evenings, does grocery shopping Sunday mornings, get a haircut on the last Saturday of a month, etc.

At 308, the financial institution computing system 130 determines a need of the customer based at least in part on the location data and the recurring financial transaction. The customer's current/predicted location and context may be compared against the patterns of recurring financial transactions. For example, When the customer goes into the vehicle on a Friday evening, it is determined that the customer is going out for dinner according to the pattern of eating outside on Friday evenings. When the customer goes into the vehicle on Sunday morning, it is determined that the customer is going grocery shopping according to the pattern of grocery shopping on Sunday mornings. When the customer goes into the vehicle at the last Saturday of a month, it is determined that the customer is going to a barber's store according to the pattern of haircut on the last Saturday of the month. It should be understood that the approaches discussed herein are for illustration not for limitation. Various techniques can be used to predict the customer's need based on the current/predicted location of the customer.

If the need of the customer cannot be identified at 308, the method 300 proceeds to 302 and more transaction data are collected. If the need of the customer is identified at 308, the financial institution computing system 130 determines a plurality of locations where the at least one of the good and the service can be obtained and a cost of the at least one of the good and the service at each respective location, at 310. The financial institution computing system 130 can search the merchant profile database 139 for merchants that provide the good/service. In some arrangements, a distance threshold (e.g., 20 miles, 30 miles, 50 miles, etc.) from the current/predicted location is set for the plurality of locations.

At 312, the financial institution computing system 130 calculates a cost of travel from the location of the customer to each respective location. The cost of travel may include both fuel and time.

At 314, the financial institution computing system 130 determines a recommended location based on the respective cost of the at least one of the good and the service and the respective cost of travel to each respective location. In some arrangements, potential saving at a particular location is compared with the cost of travel to the location. If the potential saving is larger than the cost of travel, it is determined worthwhile traveling to the particular location. If the potential saving is smaller than or equal to the cost of travel, it is determined not worth driving to the location. The potential saving is the difference of costs for the good/service between the current/predicted location and another location where the good/service can be obtained.

In some arrangements, location based cost of living is factored in when the customer need is not specific homogeneous goods/services (e.g., gasoline, iPad), but flexible and subject to many factors such as price points and promotions. For example, when the customer is going grocery shopping, the customer buys a basket of food for a week. The customer may choose organic food if the price of organic food is within budget but may not if the price is beyond the budget. As another example, the customer goes to a shopping mall to spend a weekend day. The customer might want to buy some clothes if there is good deal, watch a movie if there is something interesting, and have lunch at a restaurant in the mall. When location based costs of living are leveraged, better cost performance ratio can be achieved, thus the customer may have a better onsite shopping experience.

In some arrangements, a price map is generated for displaying the location-based costs of living at a user interface (e.g., the user interface 116 of the in-vehicle device 110), as shown in FIG. 2. Like contour lines on a map, curves 202, 204, 206, and 208 represent the price contour lines on a map centered at the current/predicted location. Locations on curve 202 have a first level of cost of living, locations on curve 204 has a second level of cost higher than the first level, and so on. The costs of living data may break down by types of consumption (e.g., personal maintenance services, grocery shopping, entertainment, etc.), geographic areas, and demographic groups (e.g., age, gender, income, etc.). In some arrangements, the costs of living data is updated periodically, for example, once every week. It should be understood that the price contour lines are an illustration not a limitation for presenting the community based cost of living information. Any suitable approaches can be utilized to present the community based cost of living information.

In some arrangements, local tax rates and/or duty free options (e.g., duty free stores at an airport) are incorporated into consideration when determining whether to recommend a particular location to the customer. For example, the local tax rates and/or duty free options are used to adjust the difference of prices between different locations.

In some arrangements, historical activities of the customer are used in determining whether and what to recommend to the customer through data mining and machine learning. As an example, historical activities of the customer show that the customer has been to steak houses the most, Italian food restaurants the second most, Asian food restaurants the third most, and so on. Restaurants being recommended may be in the order of steak houses, Italian food restaurants, Asian food restaurants, and so on. As another example, according to past activities, the customer has never been any recommended barber shops maybe because the customer strongly prefers a barber in the current barber shop he/she is using. No other barber shops would be recommended to the customer when the customer is on the way to get a haircut. It should be understood that the examples described here are for illustration not for limitation. The information of the customer's past activities can be used in various ways to make recommendations to the customer.

In some arrangements, demographics are taken into consideration in determining whether and what to recommend to the customer using demographics statistics of a plurality of customers in the same demographic group as the customer. As an example, consumption data indicate that 80% retired people have been willing to travel extra 30 minutes to save $20 on groceries, while only 20% young professionals have been willing to do so. If the customer is a young professional, a grocery store with a potential saving of $20 but requiring 30 more minutes of driving to the customer would not be recommended to the customer.

As another example, services used by customers in the same demographic group are taken into consideration in determining whether and what to recommend to the customer. For example, consumption data indicate that young males are likely to watch a movie at a movie theatre inside a shopping mall while young females are likely to have a spa at the shopping mall. If the current customer is a young male, saving on watching a movie is considered in determining shopping malls to recommend. If the current customer is a young female, saving on spa services is considered in determining shopping malls to recommend. It should be understood that the examples described here are for illustration not for limitation. The information of the demographics statistics can be used in various ways to make recommendations to the customer.

In some arrangements, a merchant may offer a deal that is upcoming in the near future and the upcoming offer may be presented to the customer and recommendation to postpone the activity is made accordingly. As an example, a barber shop offers a $5 off coupon that can be used in the following week, the coupon is presented to the customer on his/her way to get a haircut (e.g., every four weeks) and the recommendation suggests to have the haircut next week.

If the financial institution computing system 130 determines no location for recommending to the customer at 314, the method 300 proceeds to 302 and more transaction data are collected. If one or more locations for recommending to the customer are determined at 314, the financial institution computing system 130 transmits the recommendation to the in-vehicle device 110 via the network 102, at 316. In some arrangements, the recommended locations of merchants are presented along with offers/promotions provided by the merchants. For example, the recommendation to drive to barber stores at a particular neighborhood to get a haircut may be more specific, including current prices, applicable coupons, real-time offers from business offering the needed hair cut services. In some arrangements, various factors and parameters of the individuals are analyzed that are the potential receivers of any offers. For example, a merchant may have different offers for its members and non-members. It is determine whether the customer is a member of the merchant and respective offers are presented to the customer accordingly.

Figure 4:
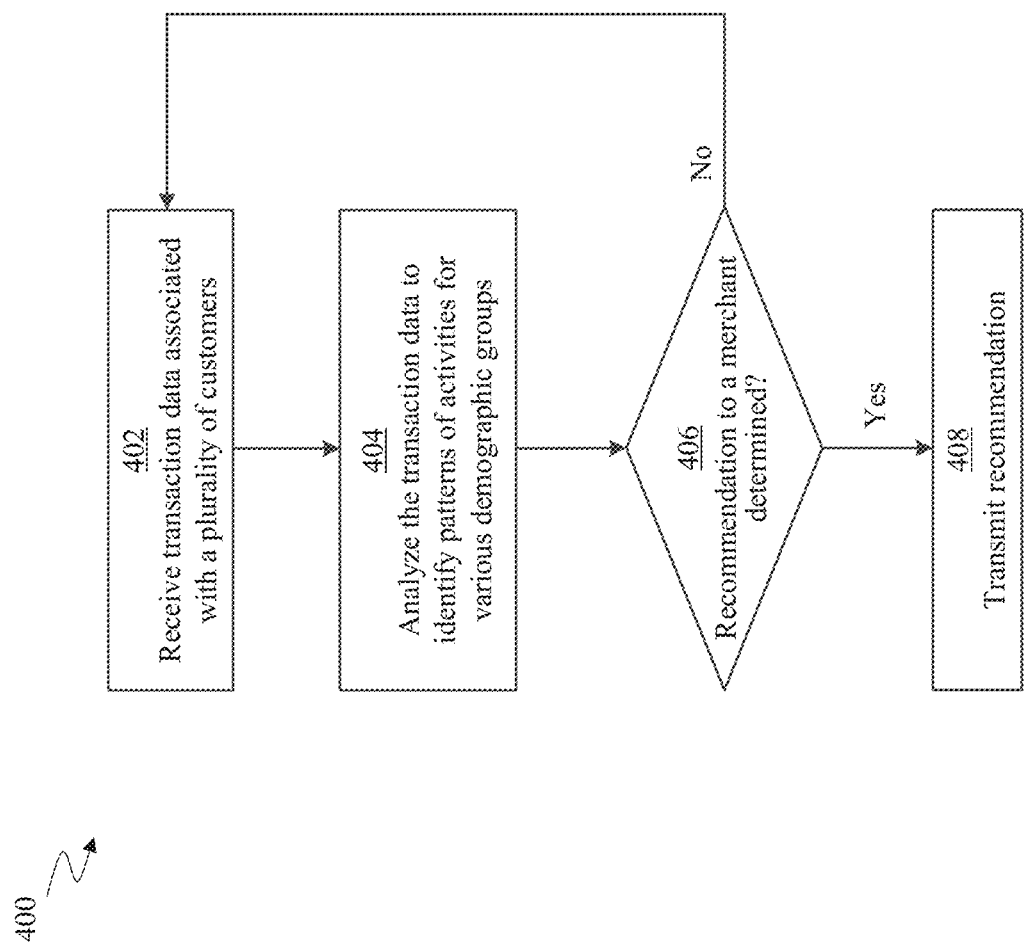
FIG. 4 is a flow diagram of a method of recommending offers to merchants according to an example embodiment.

Referring to FIG. 4, a flow diagram of a method 400 of making offer recommendations to merchants is shown according to an example embodiment. In some arrangements, the method 400 is performed by a server, for example, the financial institution computing system 130 (e.g., by the processor 131).

At 402, the financial institution computing system 130 receives transaction data associated with a plurality of customers. During the process of providing services to customers (e.g., banking services, credit card clearing and settlement, check clearing and settlement, etc.), the financial institution computing system 130 may receive data indicative of various aspects of transactions associated with a plurality of customers. The transaction data may indicate how much money people spend on food, clothing, shelter, transportation, etc. in a period of time. In some arrangements, the transaction data may break down by various categories, such as geographic areas, demographic groups, types of consumption, etc. In some arrangements, the consumption data is updated on a real-time basis. As an example, transaction data show that hotel reservation has increase for certain area due to, for example, an upcoming event (e.g., conference). A change in demographics is predicted, e.g., more professionals are brought into to the area.

At 404, the financial institution computing system 130 analyzes the transaction data to identify patterns of activities for various demographic groups. For example, transaction data may show that 80% of retired people are willing to drive extra 30 minutes to a grocery store to save $20 while only 20% young professionals are willing to do so.

At 406, the financial institution system 130 determines a recommendation to a merchant based on the pattern of activities for various demographic groups. As discussed above at 402, transaction data may show that retired people are more willing to drive extra 30 minutes to a grocery store to save $20 while young professionals are less willing to do so. The recommendations to a grocery store may include pushing an offer (e.g., send advertisements/coupons in mail) to retired people within, for example, 30 miles. In some arrangements, the information of a particular customer (e.g. a retired person) are not included in the recommendations.

In some arrangements, recommendations include suggested price points (e.g., suggested retail price) for specific goods/services. For example, transaction data may show that sales of specific goods/services can increase 10% when the price point drops 5% for certain demographics group at certain geographic areas. Recommendations to merchants in the area may include reducing the price point by 5% if still profitable. It should be understood that the example is described herein for illustration not for limitation. Any appropriate targeted advertising technologies can be used to determine recommendations to merchants.

In some arrangements, recommendations are determined based on changing demographics. As discussed above at 402, a change in demographics can be predicted in light of an upcoming event, for example, more professionals are brought into to the area by a conference. Recommendations to local merchants can be adjusted accordingly. For example, recommendations to merchant may include raising the price by local hotels, increasing happy hour events by local restaurants and bars, not offering discounts by local dry cleaners, and so on. It should be understood that the examples described herein are for illustration not for limitation. Information on changing demographics can be used to make recommendations to merchants in any suitable ways.

If the financial institution computing system 130 determines no recommends to the merchant at 406, the method 400 proceeds to 402 and more transaction data are collected. If recommendations to the merchant are determined at 406, the financial institution computing system 130 transmits the recommendations to the merchant computing system 120 via the network 102, at 408. In some arrangements, the financial institution computing system 130 provides recommendations at a cost to merchants who have subscribed to the service. In some arrangements, the financial institution computing system 130 provides recommendations for free to merchants who are using banking services of the financial institution.

In further arrangements, the merchant may ask the financial institution providing the recommendations to reach out to appropriate people on its behalf. The financial institution computing system 130 may save the electronic advertisements/coupons and present them to the in-vehicle device 110 associated with targeted people.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method comprising:
    receiving transaction data comprising transaction information associated with an account of a customer of a financial institution;
    receiving location data comprising a physical location of the customer;
    analyzing the transaction data, by a computing system, to determine a recurring financial transaction associated with at least one of a good or a service;
    determining, by the computing system, a need of the customer for the at least one of the good or the service based at least in part on the location data and the recurring financial transaction;
    determining a plurality of locations where the at least one of the good or the service can be obtained and a cost of the at least one of the good and the service at each respective location;
    determining cost of living data for the plurality of locations based on types of consumption, geographic areas, and demographic groups;
    for each of the plurality of locations, calculating a cost of travel from the physical location of the customer to each respective location;
    determining a recommended location based on the respective cost of the at least one of the good or the service and the respective cost of travel to each respective location;
    generating a price map for display at a user device, wherein the price map shows at least the recommended location, a price of the at least one of the good or the service at the recommended location, and the cost of living data for the recommended location; and
    transmitting, by the computing system to the user device of the customer, the recommended location including information on the at least one of the good or the service and the price map.

2. The method of claim 1, wherein the location data includes data indicative of a predicted location of a vehicle carrying the customer.

3. The method of claim 2, wherein the predicted location is input by the customer to the user device as a destination.

4. The method of claim 2, wherein the predicted location is determined by the user device based on one or more historical activities of the customer.

5. The method of claim 1, wherein the location data includes data indicative of a current location of the customer.

6. The method of claim 5, wherein the current location is tracked by a GPS device on the user device.

7. The method of claim 1, further comprising:
    computing, by the computing system, a potential savings of the at least one of the good or the service at the recommended location.

8. The method of claim 7, further comprising determining it is worth traveling to the recommended location in response to the potential savings of the at least one of the good or the service at the recommended location being larger than the cost of travel to the recommended location.

9. The method of claim 7, wherein computing the potential savings comprises:
    determining, by the computing system, a first cost of the at least one of the good or the service at a first location, wherein the first location is a current location of the customer or a predicted location of the customer;
    determining, by the computing system, a second cost of the at least one of the good or the service at the recommended location;
    calculating, by the computing system, the cost to travel from the first location to the recommended location; and
    computing, by the computing system, the potential savings as a difference between the second cost and the first cost, less the cost of travel.

10. A computing system comprising:
    a network interface configured to communicate data to and from external devices;
    memory; and
    a processor performing operations from the memory to:
        receive transaction data comprising transaction information associated with an account of a customer of a financial institution;
        receive location data comprising a physical location of the customer;
        analyze the transaction data to determine a recurring financial transaction associated with at least one of a good and a service;

determine a need of the customer for the at least one of the good and the service based at least in part on the location data and the recurring financial transaction;

determine a plurality of locations where the at least one of the good and the service can be obtained and a cost of the at least one of the good and the service at each respective location;

determine cost of living data for the plurality of locations based on types of consumption, geographic areas, and demographic groups;

for each of the plurality of locations, calculate a cost of travel from the physical location of the customer to each respective location;

determine a recommended location based on the respective cost of the at least one of the good and the service and the respective cost of travel to each respective location;

generate a price map for display at a user device, wherein the price map shows at least the recommended location, a price of the at least one of the good or the service at the recommended location, and the cost of living data for the recommended location; and transmit, to the user device of the customer, the recommended location including information on the at least one of the good or the service and the price map.

11. The computing system of claim 10, wherein the location data includes data indicative of a predicted location of a vehicle carrying the customer.

12. The computing system of claim 11, wherein the predicted location is at least one of input by the customer to the user device as a destination, or determined by the user device based on one or more historical activities of the customer.

13. The computing system of claim 10, wherein the location data includes data indicative of a current location of the customer, wherein the current location is tracked by a GPS device on the user device.

14. The computing system of claim 10, wherein the processor is further structured to compute a potential savings of the at least one of the good or the service at the recommended location.

15. The computing system of claim 14, wherein the processor is further structured to determine it is worth traveling to the recommended location in response to the potential savings of the at least one of the good or the service at the recommended location being larger than the cost of travel to the recommended location.

16. The computing system of claim 14, wherein computing the potential savings comprises:

determining a first cost of the at least one of the good or the service at a first location, wherein the first location is a current location of the customer or a predicted location of the customer;

determining a second cost of the at least one of the good or the service at the recommended location;

calculating the cost to travel from the physical location of the customer to the recommended location; and computing the potential savings as a difference between the second cost and the first cost, less the cost of travel.

17. A non-transitory computer-readable media having computer-executable instructions embodied therein, when executed by a processor of a computing system, cause the computing system to perform a process, the process comprising:

receiving transaction data comprising transaction information associated with an account of a customer of a financial institution;

receiving location data comprising a physical location of the customer;

analyzing the transaction data to determine a recurring financial transaction associated with at least one of a good or a service;

determining a need of the customer for the at least one of the good or the service based at least in part on the location data and the recurring financial transaction;

determining a plurality of locations where the at least one of the good or the service can be obtained and a cost of the at least one of the good and the service at each respective location;

determining cost of living data for the plurality of locations based on types of consumption, geographic areas, and demographic groups;

for each of the plurality of locations, calculating a cost of travel from the physical location of the customer to each respective location;

determining a recommended location based on the respective cost of the at least one of the good or the service and the respective cost of travel to each respective location;

generating a price map for display at a user device, wherein the price map shows at least the recommended location, a price of the at least one of the good or the service at the recommended location, and the cost of living for the recommended location; and transmitting, to the user device of the customer, the recommended location including information on the at least one of the good or the service and the price map.

18. The media of claim 17, wherein the process further comprises a potential savings of the at least one of the good or the service at the recommended location.

19. The media of claim 18, wherein the process further comprises determining it is worth traveling to the recommended location in response to the potential savings of the at least one of the good or the service at the recommended location being larger than the cost of travel to the recommended location.

20. The media of claim 18, wherein computing the potential savings comprises:

determining a first cost of the at least one of the good or the service at a first location, wherein the first location is a current location of the customer or a predicted location of the customer;

determining a second cost of the at least one of the good or the service at the recommended location;

calculating the cost to travel from the physical location of the customer to the recommended location; and computing the potential savings as a difference between the second cost and the first cost, less the cost of travel.

* * * * *